(12) United States Patent
Tucovic

(10) Patent No.: US 9,043,698 B2
(45) Date of Patent: May 26, 2015

(54) METHOD FOR USERS TO CREATE AND EDIT WEB PAGE LAYOUTS

(76) Inventor: Aleksandar Tucovic, Winnipeg (CA)

( * ) Notice: Subject to any disclaimer, the term of this patent is extended or adjusted under 35 U.S.C. 154(b) by 108 days.

(21) Appl. No.: 13/073,432

(22) Filed: Mar. 28, 2011

(65) Prior Publication Data

US 2012/0254733 A1  Oct. 4, 2012

(51) Int. Cl.
*G06F 17/24* (2006.01)
*G06F 17/21* (2006.01)

(52) U.S. Cl.
CPC .............. *G06F 17/212* (2013.01); *G06F 17/24* (2013.01)

(58) Field of Classification Search
CPC ................................ G06F 17/212; G06F 17/24
USPC ......................................................... 715/246
See application file for complete search history.

(56) References Cited

U.S. PATENT DOCUMENTS

| | | | | |
|---|---|---|---|---|
| 5,649,133 | A * | 7/1997 | Arquie .......................... | 715/764 |
| 5,745,910 | A * | 4/1998 | Piersol et al. ................. | 715/210 |
| 5,873,106 | A * | 2/1999 | Joseph .......................... | 715/203 |
| 6,266,684 | B1 * | 7/2001 | Kraus et al. ................... | 715/209 |
| 6,310,631 | B1 * | 10/2001 | Cecco et al. ................. | 715/792 |
| 6,725,238 | B1 * | 4/2004 | Auvenshine .......................... | 1/1 |
| 7,216,290 | B2 * | 5/2007 | Goldstein et al. ............. | 715/234 |
| 7,290,006 | B2 * | 10/2007 | Xie et al. .............................. | 1/1 |
| 8,185,819 | B2 * | 5/2012 | Sah et al. ....................... | 715/243 |
| 8,205,152 | B2 * | 6/2012 | Ivarsoy et al. ................ | 715/246 |
| 2004/0177316 | A1 * | 9/2004 | Layzell et al. ................ | 715/500 |
| 2007/0113174 | A1 * | 5/2007 | Iwasaki ......................... | 715/517 |
| 2009/0006454 | A1 | 1/2009 | Zarzar | |

FOREIGN PATENT DOCUMENTS

JP    2012160002 A  *  8/2012

OTHER PUBLICATIONS

Raggett, Dave et al. "HTML 4.0 Specification" Apr. 24, 1998, W3C.*
Colligan, Paul et al. "Special Edition Using Microsoft Office FrontPage 2003". Nov. 21, 2003, Que.*
Buyens, Jim. "Microsoft Office FrontPage 2003 Inside Out" Sep. 3, 2003, Microsoft Press.*
Huffman, David A. "A Method for the Construction of Minimum-Redundancy Codes" 1952, IEEE.*

(Continued)

*Primary Examiner* — Cesar Paula
*Assistant Examiner* — Tyler J Schallhorn
(74) *Attorney, Agent, or Firm* — Kyle R. Satterthwaite; Ryan W. Dupine; Ade & Company Inc

(57) ABSTRACT

A computer implemented method of editing a layout of areas on a page, for example for webpage design, includes displaying the layout in a user interface along with control elements operable via a user input device to manipulate user-variable attributes of the layout, the user-variable attributes including at least one of a number count of subdivisions in said layout, dimensions of said subdivisions in said layout, and border direction between each pair of adjacent subdivisions in said layout. Input via the user input device and the control elements is received to modify one or more of the user-variable attributes. Stored data representing the layout is updated based on the user input, and the display of the layout is updated based on the updated data to present a revised layout based on new values of the user-variable attributes.

20 Claims, 17 Drawing Sheets

(56) References Cited

OTHER PUBLICATIONS

Jacobson, Guy. "Space-efficient Static Trees and Graphs" 1989, IEEE.*
C. Brian Atkins, Adaptive Photo Collection Page Layout, Imaging Technology Department, HP Labs, Palo Alto, CA, USA 94304.
D.F. Wong and C.L. Liu, A New Algorithm for Floorplan Design, 23rd Design Automation Conference, 1986 IEEE, Springfield, Urbana, IL, USA.
Eldan Goldenberg, Automatic layout of variable-content print data, MSc in Evolutionary and Adaptive Systems, Aug. 2002, Brighton, UK.
Joe Geigel and Alexander Loui, Automatic Page Layout Using Genetic Algorithms for Electronic Albuming, Research and Development, Eastman Kodak Company, Rochester, NY, USA, http://academic.research.microsoft.com/Paper/4488.aspx.
Liqun Chen, Xing Xie, Wie-Ying Ma, Hong-Jiang Zhang, Heqin Zhou, and Huanqing Feng, Dress: A Slicing Tree Based Web Representation for Various Display Sizes, Technical Report, MSR-TR-2002-126, Nov. 16, 2002, Redmond, WA, USA.
Alan Borning, Richard Kuang-Hsu Lin and Kim Marriott, Contraint-Based Document Layout for the Web, Seattle, Washington, USA and Victoria, Australia, http://academic.research.microsoft.com/Paper/751593.aspx.
Ben Schneiderman, Tree visualization with Tree-maps: a 2-d space-filling approach, Jun. 18, 1991, College Park, Maryland, USA, http://www.cs.kent.edu/~jmaletic/cs63903/papers/shneiderman92.pdf.
Abdul Rahim Ahmad, Otman Basir and Khaled Hassanein, Fuzzy Inferencing in the Web Page Layout Design, Waterloo, ON, Canada and Hamilton, ON, Canada, http://www.iceis.org/iceis2003/abstracts_2003.htm.
Rick C.S. Chen, Stephen J. H. Yang and Jia Zhang, Enhancing the precision of content analysis in content adaptation using entropy-based fuzzy reasoning, Expert Systems with Applications (2010) doi:10.1016/j.
Jeff J. S. Huang, Stephen J. H. Yang, Zac S.C. Chen and Frank C.C. Wu, Web Content adaptation for mobile device: A fuzzy-based approach, Knowledge Management & E-Learning: an International Journal, vol. 4, No. 1.
David Gibson, Kunal Punera, and Andrew Tomkins, The Volume and Evolution of Web Page Templates, (Confidential Submission to WWW 2005 for PC Evaluation Only) WWW2005, May 10-14, 2005, Chiba, Japan.
Brent Heslop, David Angell, and Peter Kent, Word 2003 Bible, 2003, Wiley Publishing Inc., Indianapolis, XP002688990, ISBN: 0-7645-3971-X.
Dicky, 15 Really Usefull Web-based HTML editors, WebDesignBooth, Jul. 17, 2009, XP55047393; http://www.webdesignbooth.com/15-really-useful-web-based-html-editors/.
Dominique Hazael-Massieux, Tableless layout HowTo, Mar. 1, 2002, XP55044863; http://www.w3.org/2002/03/csslayout-howto.

* cited by examiner

0           V00           H00
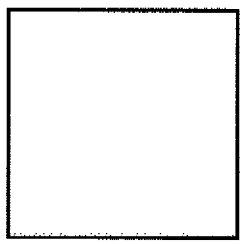
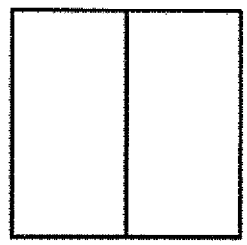
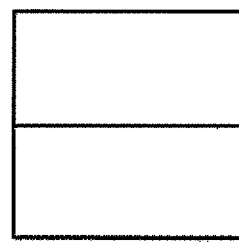
Figure 1          Figure 2          Figure 3
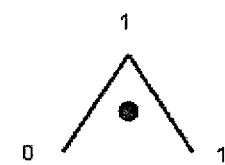
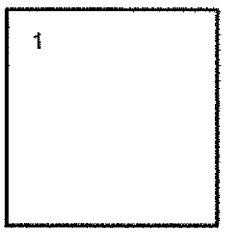
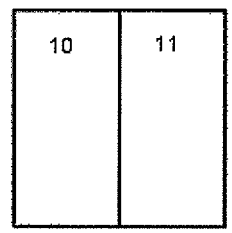
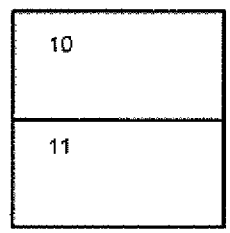
Figure 4          Figure 5          Figure 6

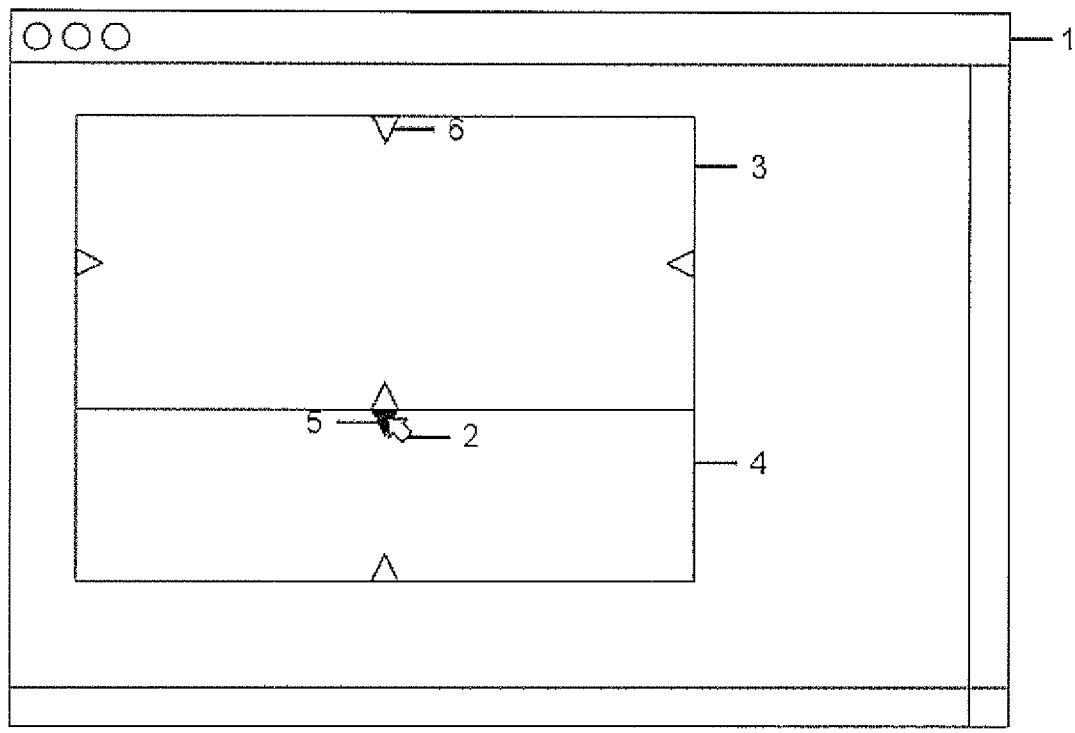
Figure 14 - Progressing from figure 13, resizing primary subdivision

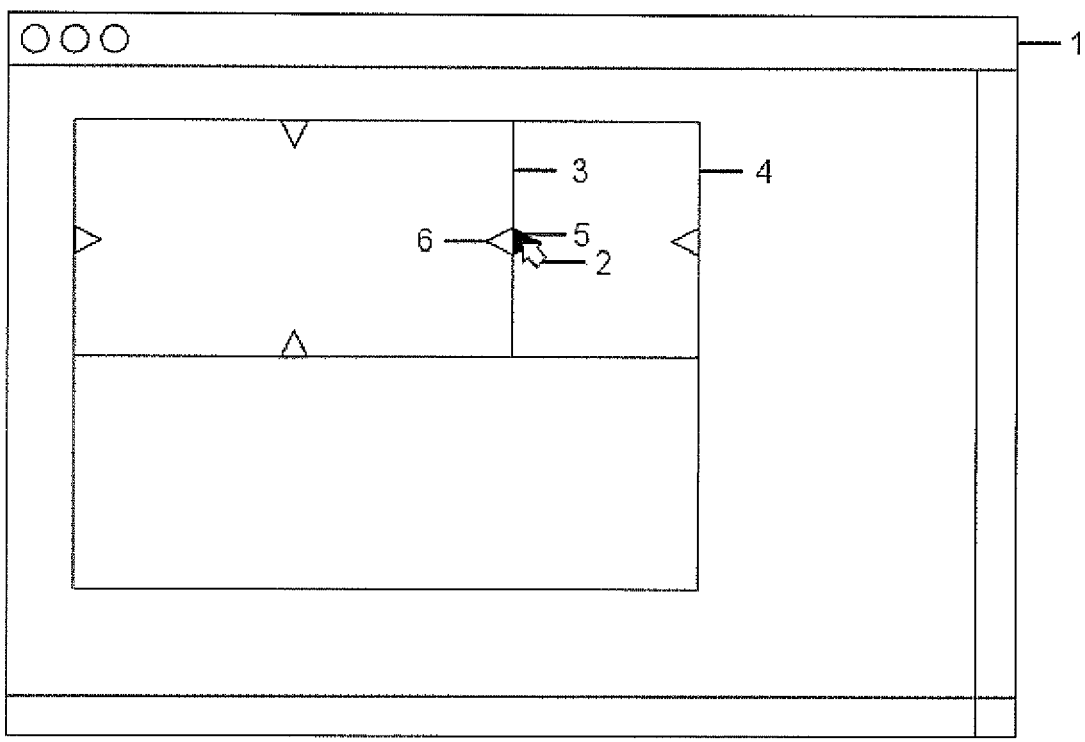
Figure 15 - Progressing from figure 13, left insertion from primary subdivision

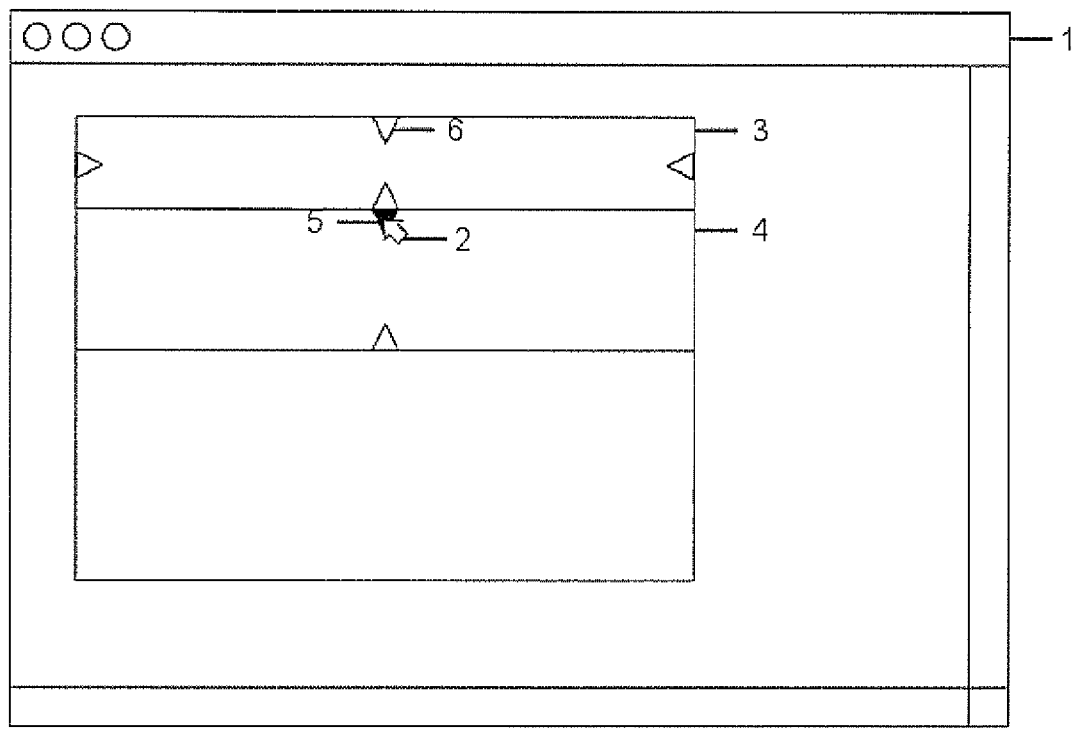
Figure 16 - Progressing from figure 13, top insertion from primary subdivision

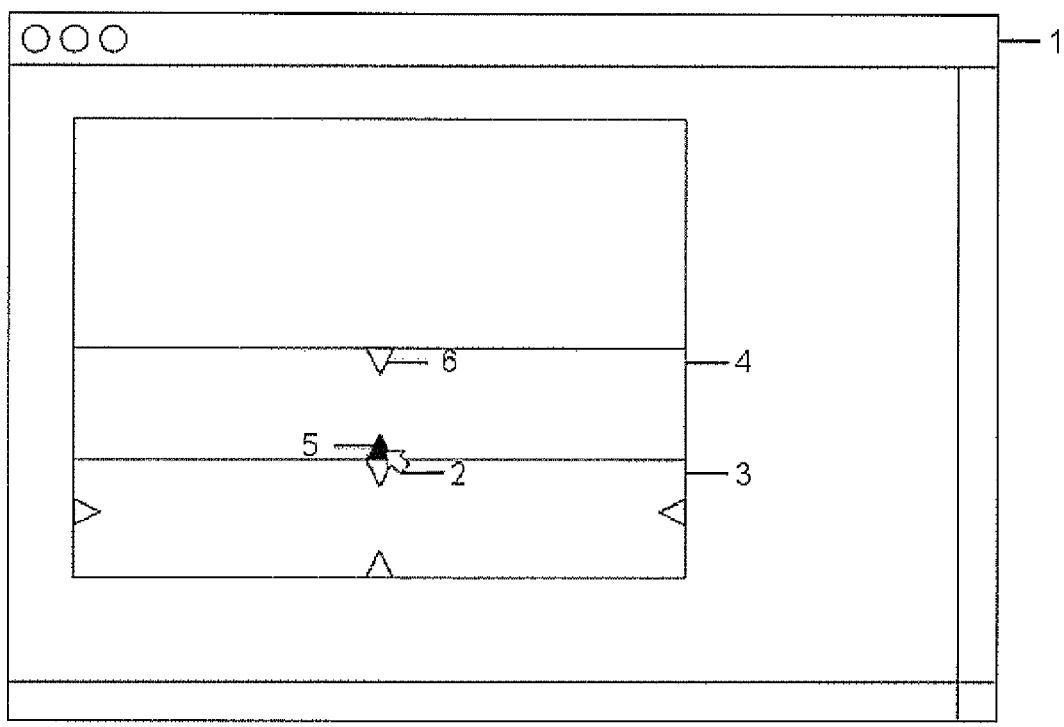
Figure 17 - Progressing from figure 13, bottom insertion from secondary subdivision

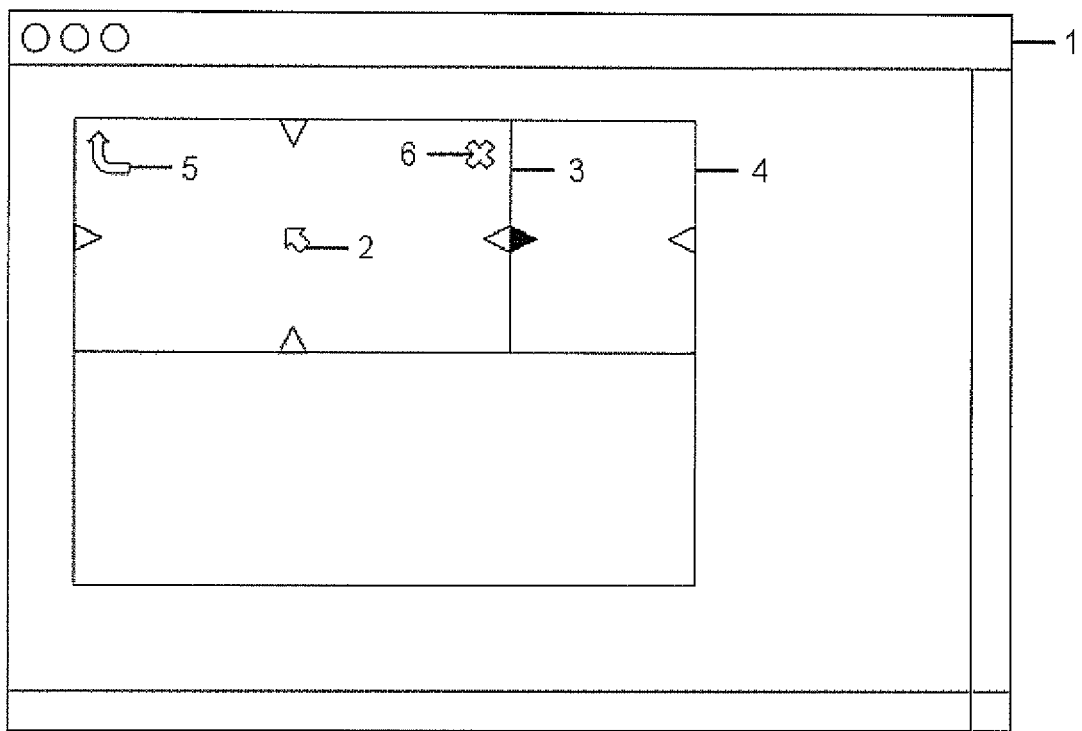
Figure 18 - Progressing from figure 15, displaying bounding selector icon and deletion icon

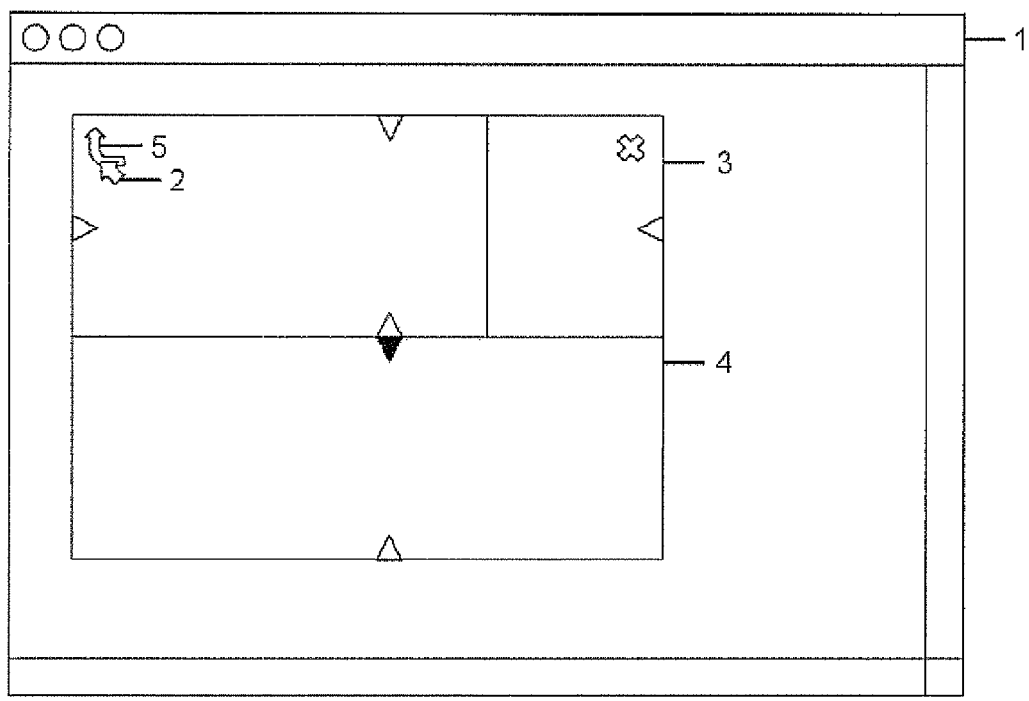
Figure 19 - Progressing from figure 18, primary subdivision's bounding division

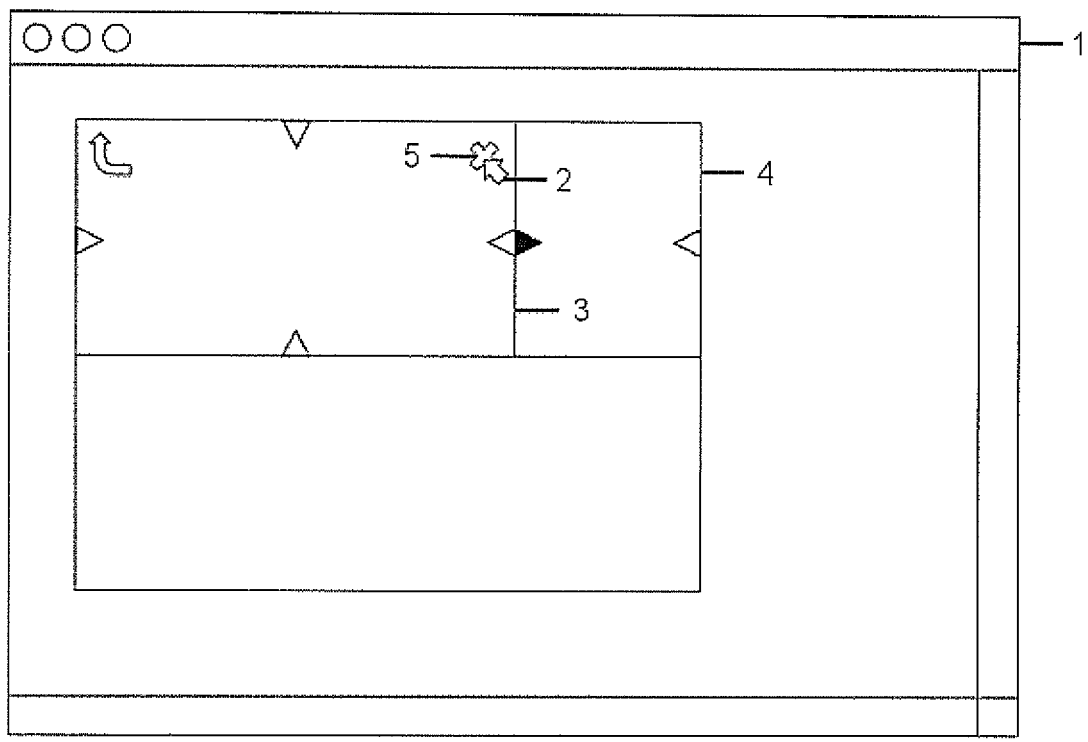
Figure 20 - Progressing to figure 13, deleting primary subdivision

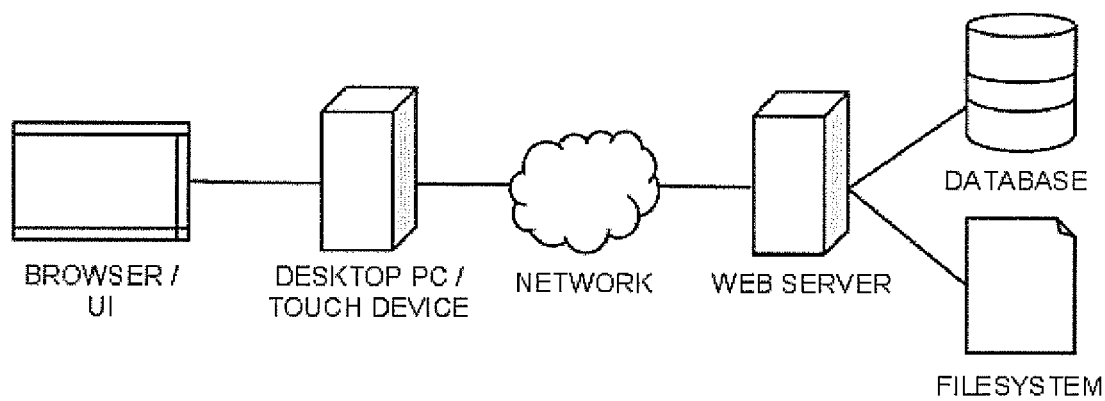
Figure 21 - Network Overview

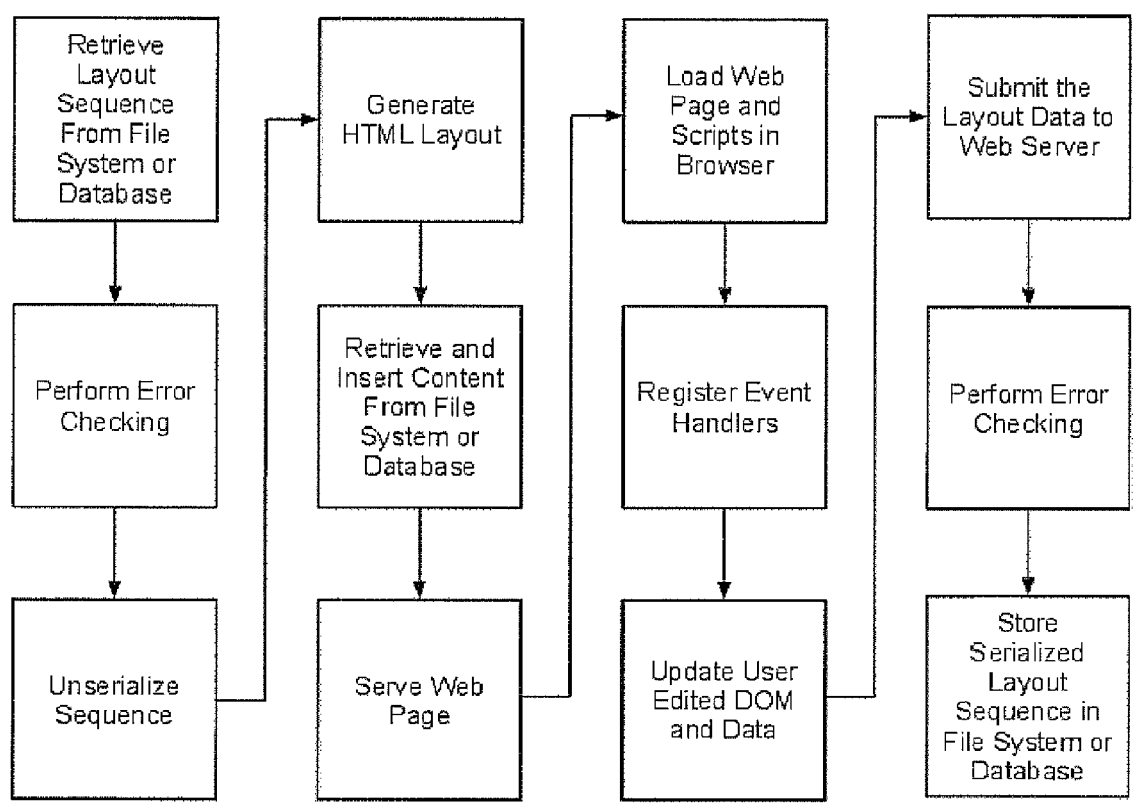
Figure 22 - Application Logic Sequence

METHOD FOR USERS TO CREATE AND EDIT WEB PAGE LAYOUTS

BACKGROUND OF THE INVENTION

This invention is a method for users to create and edit web page layouts in a consistent manner and offers a means for describing a web page layout of any level of complexity. This invention also allows for the possibility of storing and sharing layouts by means of a compact serialized sequence of characters representing the layout. This method also allows for templates to be embedded in other templates and for content to be included in the templates.

Website design is an evolving practice and there are modern standards for web page design. One of the more difficult things in web design is to define a layout in a standard way and edit it later especially if it is a complex layout. Even if standards were followed there are numerous approaches with some approaches favoured over others.

Prior art involves HTML documents coupled with CSS (cascading style sheets) to define the layout as written and stored in static text documents. The prior art in web page design includes misusing HTML TABLE tags that were meant to be used for tabular data but were used for layouts—TABLE tags does not lend itself well to layouts. Prior art is also accomplished via software that is used to design web page layouts in what is known as WYSIWYG (What You See Is What You Get) editors. WYSIWYG editors display an approximation of the final displayed layout. The invention allows for direct display and manipulation of the layout in modern web browsers. The invention encodes the layout in a compact format regardless of complexity of the layout. The compact format can then be stored, shared, used and reused in very sophisticated ways.

SUMMARY OF THE INVENTION

According to a first aspect of the invention there is provided a computer implemented method of editing a layout of areas on a page, comprising:
(a) in a user interface, displaying the layout along with control elements operable via a user input device to manipulate user-variable attributes of the layout, said user-variable attributes including at least one of a number count of subdivisions in said layout, dimensions of said subdivisions in said layout, and border direction between each pair of adjacent subdivisions in said layout;
(b) receiving input via the user input device and the control elements to modify one or more of said user-variable attributes;
(c) updating stored data representing the layout based on said user input; and
(d) updating the display of the layout in the user interface based on the updated data to present a revised layout based on new values of said one or more user-variable attributes.

Alternatively, step (b) may comprise receiving the input via a resizing element of the user interface associated with a particular one of a plurality of subdivisions of the layout, and step (c) comprises automatically updating size data associated at least one other subdivision based the user input.

Preferably the at least one other subdivision for which the size data is automatically adjusted includes two or more further subdivisions within the particular subdivision with which the resizing element is associated.

Preferably the size data of the further subdivisions is updated by splitting a size increase determined from the input for the particular subdivision among the further subdivisions based on relative sizing of said further subdivisions within said particular subdivision.

Preferably a larger portion of said increase is assigned to a larger one of said further divisions than to a smaller one of said further subdivisions.

Step (b) may comprise receiving the input via an insertion element of the user interface, and step (c) comprises automatically updating the data to reflect addition of a new subdivision inserted adjacent an existing subdivision and to automatically adjust size data of said existing subdivision and any previous subdivision based on insertion of the new subdivision.

Preferably the user input via the insertion element in step (b) includes sizing input for the new subdivision and step (c) comprises adding new size data for the new subdivision based on the sizing input.

Preferably the insertion element is a drag-and-drop element displayed at the respective side of the existing subdivision and draggable toward an opposite side thereof to create the new subdivision at said respective side.

Preferably four insertion elements are displayed in the user interface for the existing subdivision, one at each side of said existing subdivision.

Preferably drag-and-drop resize element is displayed for a secondary subdivision adjacent said existing subdivision at a side of the secondary subdivision adjacent said existing subdivision.

Step (b) may alternatively comprise receiving the input via a deletion element of the user interface associated with a particular one of a plurality of subdivisions of the layout, and step (c) comprises removing data associated with said particular subdivision from consideration in step (d) and automatically updating size data associated with one or more other subdivisions remaining in the layout to fill space previously occupied in said layout by said particular subdivision.

Preferably the stored data includes height and width data for the layout and, for each boundary between adjacent subdivisions, orientation data representing an orientation of said boundary within the layout and a single offset value that is used to position the boundary relative to a vertical or horizontal perimeter boundary of the layout.

Preferably the height and width data for the layout is used together with the single offset value for the boundary between the adjacent subdivisions to calculate a subdivision width and subdivision height of each of said adjacent subdivisions.

Preferably the user interface is displayed on a user device coupled to a server via a network connection, the server comprising memory containing the stored data representing the layout.

Preferably the user interface is displayed in a web browser of the user device.

According to a second aspect of the invention there is provided computer readable memory having recorded thereon computer executable statements and instructions that when executed by a computer perform a method of editing a layout of areas on a page, said method comprising:
(a) in a user interface, displaying the layout along with control elements operable via a user input device to manipulate user-variable attributes of the layout, said user-variable attributes including at least one of a number count of subdivisions in said layout, dimensions of said subdivisions in said layout, and border direction between each pair of adjacent subdivisions in said layout;

(b) receiving input via the user input device and the control elements to modify one or more of said user-variable attributes;
(c) updating stored data representing the layout based on said user input; and
(d) updating the display of the layout in the user interface based on the updated data to present a revised layout based on new values of said one or more user-variable attributes.

According to a third aspect of the invention there is provided a computer implemented method of editing a layout of areas on a page, comprising:
  displaying the layout in a user interface;
  receiving input reflective of a user-selection of a subdivision within the layout;
  displaying icons representative of physical bounds of the area within the layout;
  facilitating selection of the icons representing the bounds of the subdivision within the layout or subdivision for either adjustment of a selected bound to a new position or insertion of a new subdivision into the layout; and
  automatically adjusting one or more bounds of one or more other subdivisions within the layout in response to said adjustment or insertion to fill the layout with adjacent non-overlapping subdivisions.

Preferably the method includes storing a serialized sequence of values representative of the layout of adjacent non-overlapping subdivisions.

According to a fourth aspect of the invention there is provided a method of displaying a page layout comprising:
  receiving serialized data representative of the page layout;
  parsing the serialized to extrapolate data on the page layout, including data on subdivisions contained within an overall area of the page layout; and
  using the extrapolated data to present an on-screen display of the page layout.

Preferably the data on the subdivisions includes orientation data reflecting orientations of boundaries between adjacent subdivisions.

Preferably a format of the serialized data employs a three position representation of a pair of adjacent subdivisions, in which a first position contains an orientation indicator reflecting the orientation of the boundary between the adjacent subdivisions, and second and third positions contain content indicators respectively reflective of contents of said adjacent subdivisions.

Where either one of said adjacent subdivisions defines a boundary subdivision containing a pair of smaller adjacent subdivisions therein, preferably a respective three position representation of said pair of smaller adjacent subdivisions therein occupies a respective one of the second and third positions of the three position representation of the adjacent subdivisions defining the boundary subdivision.

Preferably the serialized data includes two possible characters for each orientation indicator, one representing a vertical orientation and another representing a horizontal orientation, for example, the character 'H' for horizontal and the character 'V' for vertical.

Preferably a single predetermined character is used in the second or third position of any three position representation for which a respective one of the adjacent subdivisions is empty of any further smaller subdivisions therein, for example using the character '0'.

Preferably the serialized data includes a string containing separated dimensional values.

Preferably a first two dimensional values of the string represent an overall height and width of the layout and additional dimensional values of the string after the first two dimensional values correspond to the subdivisions within the layout and are sequenced in matching order with the orientation indicators of said subdivisions in the serialized data.

Preferably the additional dimensional values consist of only a single dimensional value for each pair of adjacent subdivisions, the method including using said single dimensional value as an offset relative to one dimension of a bounding area containing said pair of adjacent subdivisions to determine a first dimension of each of said adjacent subdivisions and inheriting the other dimension of the bounding area as a second dimension of each of said adjacent subdivisions.

According to another aspect of the invention, there is provided a computer-implemented method of displaying and editing a layout of areas, the method comprising:
  (a) from a computer readable medium, retrieving serialized data representative of the page layout, the serialized data comprising a string of characters in which respective pairs of adjacent subdivisions of the layout are denoted by respective three-position representations in the string of characters, with a first position of each representation containing a single-character orientation indicator that denotes an orientation of the respective pair of adjacent subdivisions by adopting one of only two possible values that respectively denote horizontal and vertical orientations, and second and third positions of each representation containing content indicators that respectively denote contents of said respective pair of adjacent subdivisions, wherein each of the second and third positions of at least one respective pair of adjacent subdivisions is either occupied by a single-character empty-status indicator indicating that a respective one of said one respective pair of adjacent subdivisions is an empty subdivision that is empty of any further subdivisions therein, or occupied by a respective three-position representation of another pair of adjacent subdivisions to reflect that said other pair of adjacent subdivisions is contained within said respective one of said one respective pair of adjacent subdivisions, and wherein the serialized data lacks unique identifiers for the subdivisions, and the single-character empty-status indicator has only one possible value that is the same for each one of a plurality of empty subdivisions in the layout, whereby each and every character in the string of characters is has one of only three possible values;
  (b) parsing the serialized data to extrapolate data on the page layout and generate a binary tree data structure that is representative of the page layout and comprises at least one internal node representing a respective splitting of the layout or a subdivision of the layout into one of the pairs of adjacent subdivisions of the layout;
  (c) automatically generating a respective unique identifier for each empty subdivision by sequentially appending values read from a respective series of nodes located on a path between a root node of the binary tree and a respective leaf node of the binary tree into a respective string of digits, and assigning said respective string of digits to said empty subdivision as the respective unique identifier for said empty subdivision; and
  (d) using the automatically generated unique identifiers to present an on-screen display of the page layout together with on screen handles and/or icons operable via a user input device to manipulate user-variable attributes of the layout, including a number count of subdivisions in said layout and dimensions of said subdivisions in said layout;

(e) based on user input through the user input device and the on screen handles and/or icons to perform a modification one or more of said user-variable attributes of the layout, creating a revised binary tree data structure that is representative of a revised layout including said modification;

(f) performing a repetition of steps (c) and (d) using the revised binary tree data structure, thereby updating the on-screen display to show the revised layout; and (g) updating the serialized data to reflect the revised layout, and storing the updated serialized data on the computer readable medium without any subdivision unique identifiers for later retrieval of same for use in a subsequent layout display and/or editing session.

According to yet another aspect of the invention, there is provided A computer implemented method of editing a visually-borderless layout of areas on a using on-screen control elements that comprise a set of primary handles and a set of secondary handles and are operable via a user input device to manipulate user-variable attributes of the layout including a number count of subdivisions in said layout and dimensions of said subdivisions in said layout, the method comprising:

(a) in a user interface, displaying the layout along with the set of primary handles, which are automatically displayed at all four zero-border boundaries of an initially selected primary subdivision of the layout;

(b) receiving input via the user input device reflective of a selection of a different subdivision of the layout than the initially selected subdivision of step (a), and in response to said input, setting the different subdivision as a currently selected primary subdivision and changing a location in the user interface at which the control elements are displayed by automatically displaying the set of primary handles at all four zero-border boundaries of the currently selected primary subdivision instead of at the four zero-border boundaries of the initially selected subdivision of step (a), and automatically displaying the set of secondary handles at an adjacent secondary subdivision that is adjacent to said currently selected primary subdivision;

(c) receiving further input via the user input device and the control elements to modify one or more of said user-variable attributes;

(d) updating data representing the layout based on said further input; and (e) updating the display of the layout in the user interface based on the updated data to present a revised layout based on new values of said one or more user-variable attributes;

wherein the primary and secondary handles include insertion and resizing handles, and, during step (b), no handles are displayed at any subdivisions other than the currently selected primary subdivision and adjacent secondary subdivision, the set of secondary handles includes a secondary handle displayed at a zero-border outer side of the adjacent secondary subdivision that lies opposite to the primary subdivision, the set of secondary handles are visually distinct from the set of primary handles, and the primary and secondary handles serve as a sole visual indication of which subdivision has been selected and a sole visual indicator of where the zero-border boundaries of the currently selected subdivision and the zero-border outer side of the adjacent secondary subdivision reside.

BRIEF DESCRIPTION OF THE DRAWINGS

In the accompanying drawings, which illustrate exemplary embodiments of the present invention:

FIG. 1 is a schematic illustration of a empty rectangular layout and a graphical and string representation of same.

FIG. 2 is a schematic illustration and graphical and string representation of the layout of FIG. 1 after a single vertical division thereof to form two vertically oriented subdivisions.

FIG. 3 is a schematic illustration and graphical and string representation of the layout of FIG. 1 after a single horizontal division thereof to form two horizontally oriented subdivisions.

FIG. 4 is a modification of FIG. 1, showing a unique identifier of the undivided area bound by the empty layout.

FIG. 5 is a modification of FIG. 2, showing unique identifiers of the different areas bound by the two vertical subdivisions.

FIG. 6 is a modification of FIG. 3, showing unique identifiers of the different areas bound by the two vertical subdivisions.

FIG. 14 is a schematic screenshot illustration showing the user interface of FIG. 13 after resizing of the horizontal subdivisions via the resize handle.

FIG. 15 is a schematic screenshot illustration showing the user interface of FIG. 13 after insertion of a new vertical subdivision in the top horizontal subdivision.

FIG. 16 is a schematic screenshot illustration showing the user interface of FIG. 13 after insertion of a new horizontal subdivision over the previously primary subdivision.

FIG. 17 is a schematic screenshot illustration showing the user interface of FIG. 13 after insertion of a new horizontal subdivision below the secondary subdivision.

FIG. 18 is a schematic screenshot illustration of the layout of FIG. 15, but additionally showing bounding selector and subdivision deletion icons respectively operable to select a bounding subdivision containing the currently selected subdivision primary subdivision or delete the currently selected primary subdivision.

FIG. 19 is a schematic screenshot illustration showing the user interface of FIG. 18 after selection of the bounding subdivision.

FIG. 20 is a schematic screenshot illustration demonstrating the use of the subdivision deletion icon of FIG. 18, which reverts the layout of FIG. 18 back to that of FIG. 13.

FIG. 21 is a flowchart illustration of a webpage layout creating and editing process of the present invention.

FIG. 22 is a schematic illustration of a network based system for webpage layout creation and editing.

DETAILED DESCRIPTION OF THE INVENTION

The invention is a compact description of a web page layout as well as a method for modifying it. A general formula defined by an algorithm expands the formula into common standards-based HTML and CSS which when served to the user's browser is displayed and can be directly modified. When the layout is saved the algorithm will revert the layout back into a compact encoding.

A layout for the purposes of the algorithm is a rectangular area that has zero or more non-overlapping rectangular subdivisions. The initial areas and subsequent subdivisions have zero margin, border and padding for simplicity although the algorithm can accommodate margins, borders and padding.

The algorithm works by describing a layout of an initial area with a width and height. An empty layout is described by the zero character '0' (FIG. 1). An subdivided layout is 'X00' (FIGS. 2 and 3). 'X' can represent either a horizontal or a vertical oriented subdivision represented respectively by 'H' or 'V'. When there are no more subdivisions it is represented by 'X' followed by '00'. Therefore 'X00' can represent either 'H00' or 'V00' as an initial area with only two subdivisions. Any '0' representing a respective rectangular area can be subdivided into two smaller areas by replacing it with 'X00' so that 'X00' becomes 'XX000' by replacing only the first '0' with 'X00', or 'X00' becomes 'X0X00' by replacing only the second '0', or 'X00' becomes 'XX00X00' by replacing each '0'. In 'H00', the first zero represents the top subdivision and the second zero represents the bottom subdivision. In 'V00', the first zero represents the left subdivision and the second zero represents the right subdivision.

For example, 'HV000' means that the first '0' of 'H00' is further divided into a pair of vertical subdivisions, while 'H0V00' means that the second '0' of 'H00' has been further divided into a pair of vertical subdivisions. 'HV00V00' means that both of the two horizontal subdivisions have each been vertically subdivided.

The string representation of the layout is the data that is stored either in a database system or file system.

Orientation is an important aspect of the algorithm. The algorithm codifies a layout using 'H' or 'V' instead of 'X'. The algorithm sequence can be graphed (FIGS. 1 to 7). '0' is the initial empty (i.e. undivided) division (FIGS. 1 and 4). The initial area '0' can be subdivided into either 'H00' (FIGS. 2 and 5) or 'V00' (FIGS. 3 and 6).

Figure 7:
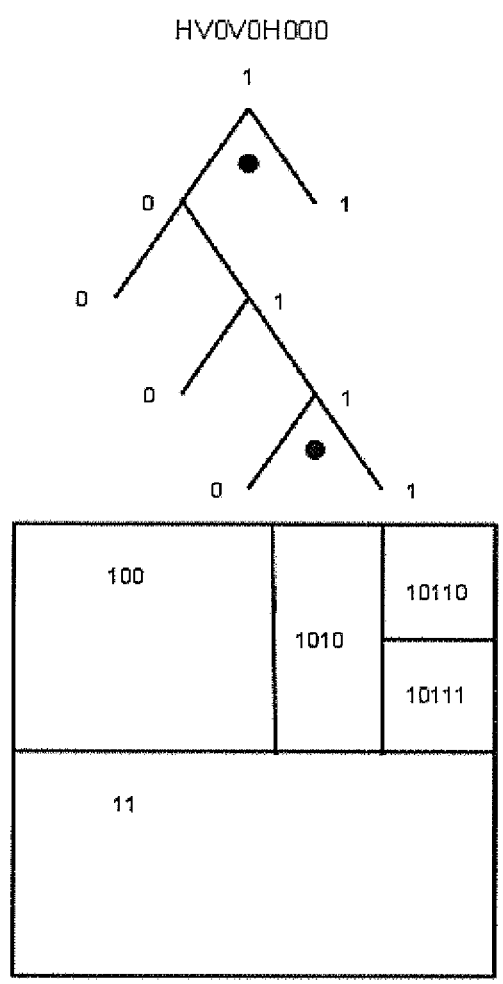
FIG. 7 is a schematic illustration and graphical and string representation of the layout of FIG. 1 after a series of divisions thereof to form a more complicated layout having five subdivisions, each labelled with its own unique identifier in the illustration.

The layout of FIG. 7 and the corresponding string representation 'HV0V0H000' can be generated from the initial empty division '0' of FIG. 1 as follows:
1. horizontally subdivide the initial area: 0→H00;
2. vertically subdivide the top one (first zero) of the two horizontally divided areas resulting from the previous step: H00→HV000;
3. vertically subdivide the right one (second zero) of the two vertically divided areas resulting from the previous step: HV000→HV0V000; and
4. horizontally subdivide the right one (second zero) of two vertically divided areas resulting from the previous step: HV0V000→HV0V0H000.

The tree graph represents one aspect of the layout by representing the orientation of the subdivisions which in the figures is demonstrated by using a dot to mark the internal nodes of the tree that mark horizontal subdivisions. The lack of a dot at an internal node represents a vertical subdivision. The algorithm processes the graphed sequence in a top-down and left-right direction. Another aspect of the layout is represented by a binary value (i.e. either a 'zero' or 'one') at each node in the graph. By reading from the top and reading left-side first off the graph and appending the values for each path from the root node to a different leaf node, a unique identifier can be specified for each distinct subdivision as a string of binary digits. The unique identifiers are used to generate the web page layout for display in the user interface, and the unique identifiers for illustrated exemplary layouts are shown in association with their respective subdivisions in FIGS. 4 to 7.

The algorithm also calculates the dimensions of the entire layout using the initial area's width and height. The layout sequence stores the layout's initial height and width but also stores one dimension for each 'X' in the sequence. The stored dimension is an offset dimension that marks a distance at which the boundary line of adjacent subdivisions should be spaced from a respective boundary of the overall layout. As the algorithm progresses through the layout sequence, the top or left one of two adjacent subdivisions has its dimensions calculated by inheriting the width of the area bounding the two adjacent subdivisions and applying the offset height if they are horizontally divided CHI or by inheriting the offset width and the bounding area's height if they are vertically divided ('V'). The bottom or right subdivision's width in the case of 'H', or height in the case of 'V', is calculated by finding the difference in the respective dimension of the bounding area and the top or left subdivision, and the remaining dimension is inherited from the bounding division. This way the width and height of each subdivision is calculated by the algorithm as it progresses along the sequence using the initial layout's dimensions and 'X's offset dimensions. The amount of data required to be stored with only the offset tends towards a quarter compared to storing the height and width of each bounding division and each subdivision.

The dimensions are simply listed in order starting with the initial layout's width and height followed by a series of offset dimensions. Given a layout (FIG. 7) with an initial width of 100 and height of 100, the offset for each 'X' would be represented, for example, by:

100, 100, 53, 50, 27, 25

The compact format of the given layout (FIG. 7) is stored in the general format:

HV0V0H000, 100, 100, 53, 50, 27, 25

The process for determining the layout begins by defining the dimensions of the initial area. The initial area's width and height are the first pair of stored dimensions. Following the definition of the initial area the sequence is parsed one character at a time. In the above example, 'H' is parsed first which determines that a top and bottom subdivision exists. When a 'X' value is parsed, then a stored dimension is parsed as well, which determines the subdivision dimensions. In this example, The third stored dimension of 53 is parsed and used to calculate the subdivision dimensions. The top and bottom subdivisions each inherit the initial area's width of 100. The top subdivision height is 53. The bottom subdivision height is the initial area's height minus the top subdivision (or stored dimension) height resulting in 100−53=47. The top subdivision dimensions are 100 pixels wide by 53 pixels high, and the bottom subdivision dimensions are 100 pixels wide by 47 pixels high. The two subdivisions are contained within the bounding division, defined in this example by the empty (i.e. undivided) initial layout.

Parsing follows this procedure:

1. START
2. Parse the first pair of stored dimensions and define the initial area's dimensions.
3. Parse the first character of the stored sequence
    a. If the first character is '0' then the parsing procedure skips to step (11)
    b. If the first character is 'X' then the parsing procedure continues to step to (4)
4. Last read 'X' is the bounding division
5. Parse the next dimension to define the subdivisions' dimensions based on the orientation in (4)
6. Parse the next character of the stored sequence
    a. If the character is '0' then the parsing is complete for the first subdivision and the parsing procedure skips to step (7).
    b. If the character is a 'X' then return to step (4) noting the 'X' as 'pending first subdivision'
7. Parse the next character of the stored sequence
    a. If the character is '0' then the parsing is complete for the second subdivision and parsing ends for the bounding division in (4), and the parsing procedure continues to step (8)
    b. If the character is a 'X' then return to step (4) noting the 'X' as 'pending second subdivision'
8. If there are no 'X's noted as 'pending subdivisions' then skip to step (11)
9. If parsing had noted the previous 'X' as 'pending first subdivision' then remove the 'X's pending status and continue to (7)
10. If parsing had noted the previous 'X' as 'pending second subdivision' then remove the 'X's pending status and continue to (8)
11. END The algorithm allows for error checking because the algorithm and the layout sequence follows consistent rules. Once the layout sequence is accessed from storage error checking is performed against the sequence: the orientation sequence has two checks and the dimensions have one check. The layout sequence is first checked using a simple checksum and if that error check passes the layout sequence is processed by checking that the layout sequence simplifies to a valid initial area of '0'. The error checking is also performed before a layout sequence is stored.

Once the layout sequence is accessed from storage and passes error checking the layout and content is generated to be displayed in a web browser using standard web page markup and styles, or other graphic standards and software. In the case of web pages the layout generator may generate a web page with HTML with embedded CSS and JavaScript components. The web page generation all occurs on the web server. The resulting web page layout is displayed in the web browser (FIG. 8).

The generated HTML layout specifies a partial DOM (Document Object Model) tree using a DIV markup. The DOM tree represents the initial area and each existing subdivision of the layout. Each DIV has an attribute ID with a unique string identifier as generated by the algorithm. In addition each DIV will have an attribute CLASS with a non-unique classification name based on its orientation as identified by 'X' in the layout sequence. A set of JavaScript functions are included in the web page that depend on the layout and the unique ID attribute and general CLASS attribute of each DIV generated by the algorithm. The JavaScript functions are classified generally by event handlers, calculators, layout generator and layout analyzer.

Figure 8:
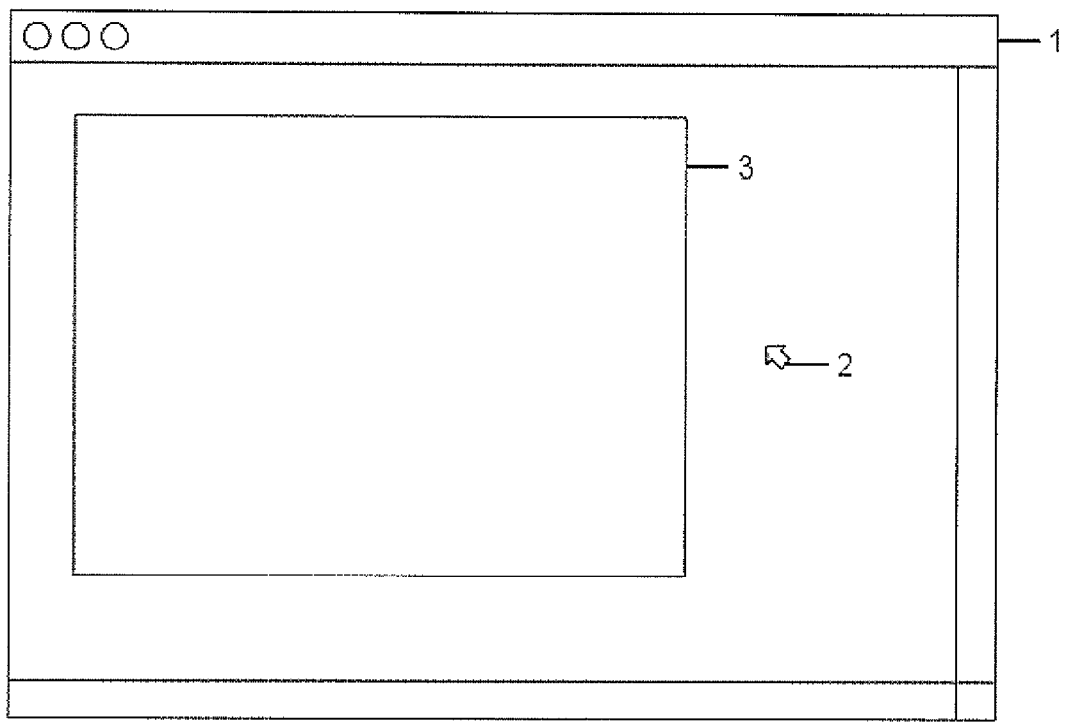
FIG. 8 is a schematic screenshot illustration showing a user interface displaying the layout of FIG. 1 within a web browser.
Figure 9:
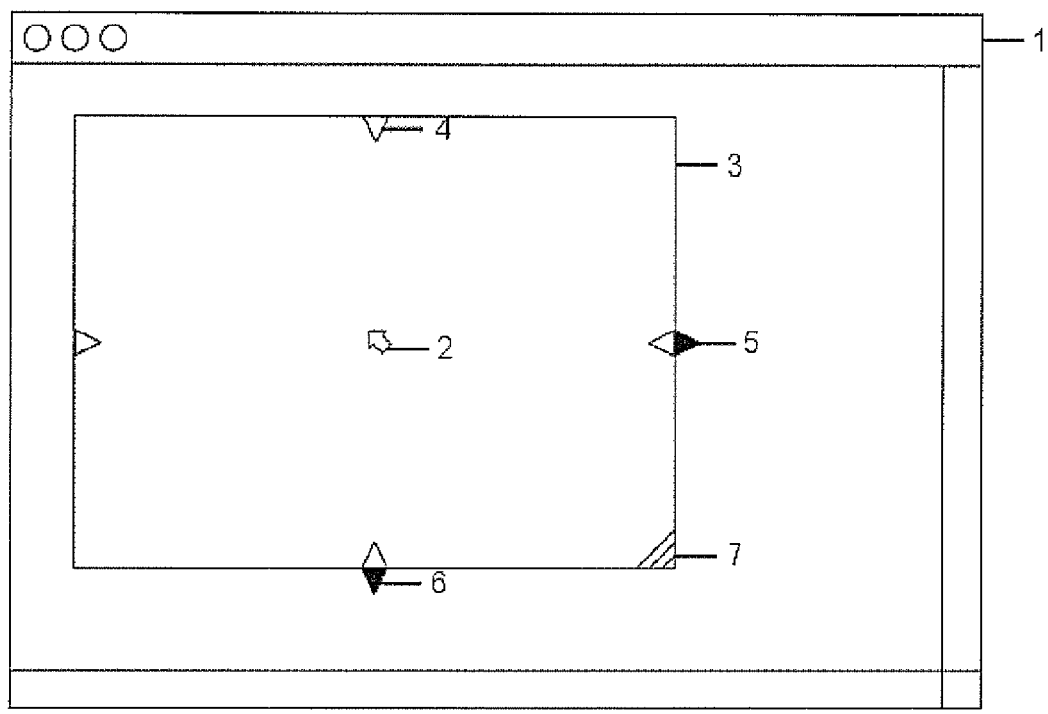
FIG. 9 is a schematic screenshot illustration showing the display of user-operable subdivision insert handles on the layout of FIG. 8.
Figure 10:
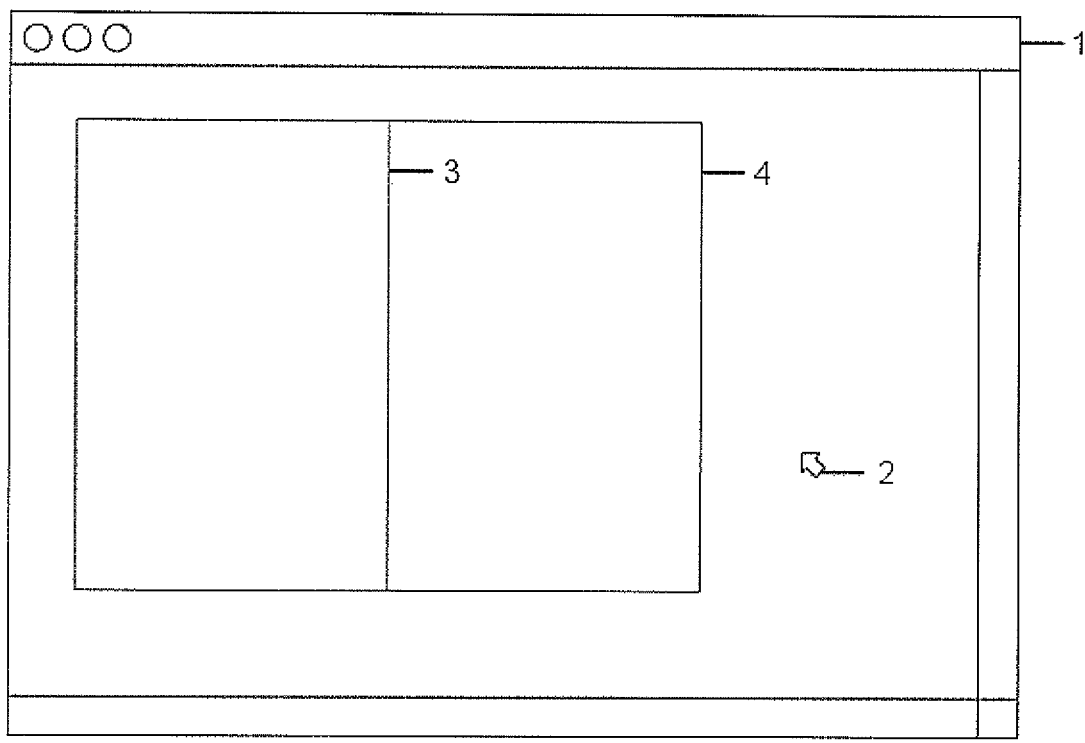
FIG. 10 is a schematic screenshot illustration showing the user interface displaying the layout of FIG. 2.

When the web page is served to the client browser the event handlers are attached to each subdivision as well as handles that will represent the bounds of selected subdivisions (FIGS. 8 and 9). Each subdivision responds to a user click or touch that generates a data representation of the layout including orientation and dimensions. Subdivisions that have responded to user clicks or touches, known as primary nodes, have a complementary subdivision known as a secondary node. Handles are placed on the primary and secondary nodes.

Figure 11:
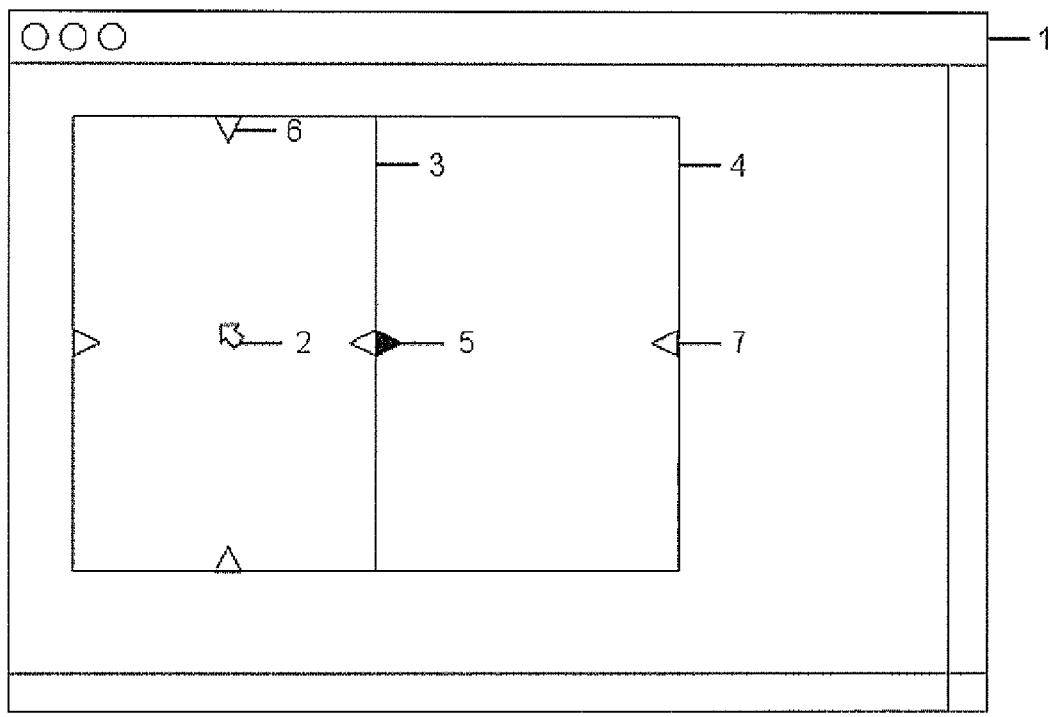
FIG. 11 is a schematic screenshot illustration showing the user interface and layout of FIG. 10 with insertion handles on a left or primary one of two vertical subdivisions and a resize handle and insertion handle of a right or secondary one of the two vertical subdivisions thereof.

A primary node has four handles that are known as insertion handles and placed on each side of the primary node subdivision (FIG. 11, Item 3). A secondary node (FIG. 11, Item 4) has two handles where one is an insertion handle and the other is known as a resize handle. The secondary node handles are placed on two sides of the secondary node where one handle is placed closest to the primary node and is the resize handle (FIG. 11, Item 5); the other handle is placed furthest from the primary node and is an insertion handle (FIG. 11, Item 7).

When a subdivision is selected, a JavaScript method generates a data structure of the primary and secondary subdivision layout. The structure parses the unique identifier of the subdivision and logically determines in a recursive manner if there are any existing layouts or subdivisions within it. The recursive method exhaustively generates the data structure that stores each unique identifier, its orientation and its dimensions as well as a unique data structure that stores, for each pair of adjacent subdivisions, a reference to the subdivision that has the greater share of the bounding area containing those adjacent subdivisions, an antecedent of the ratio of the subdivision dimensions based on orientation and a cumulative change of one pixel differences. This data structure created by the layout generator is used in the editing of the layout.

Figure 12:
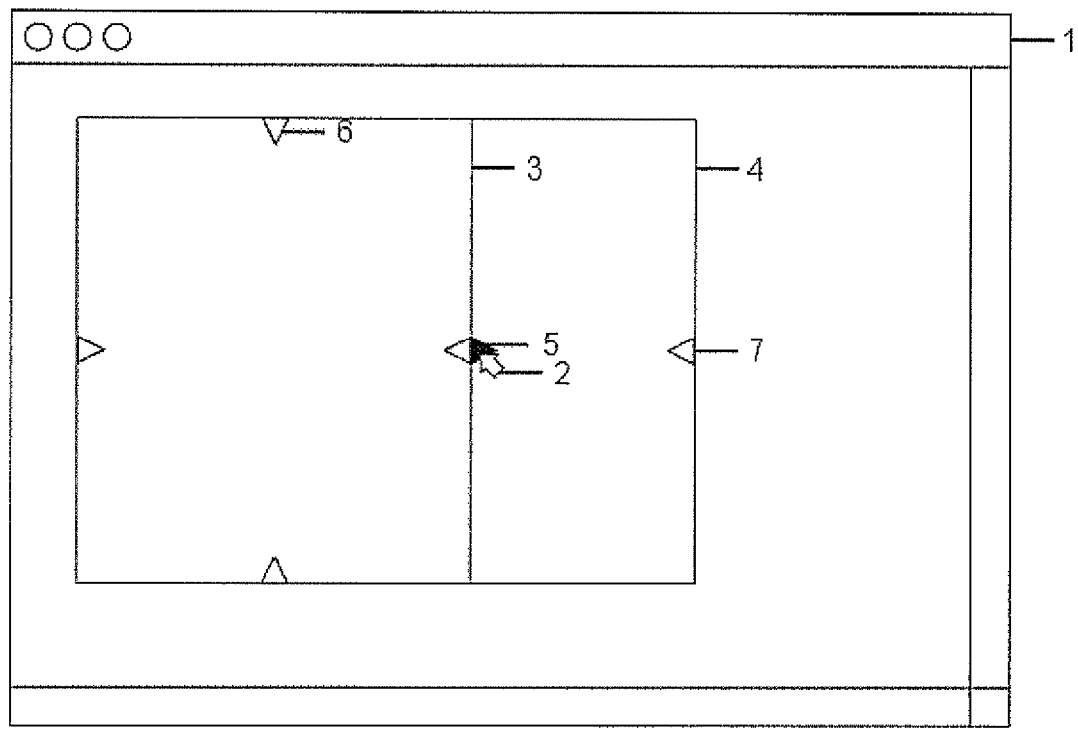
FIG. 12 is a schematic screenshot illustration showing the user interface of FIG. 11 after resizing of the vertical subdivisions via the resize handle.

To resize a subdivision it is clicked or touched for it to become the primary node with its four insertion handles (FIG. 11, Item 6) and a secondary node identified by two handles—a resize handle (FIG. 11, Item 5) and an insertion handle (FIG. 11, Item 7). Clicking or touching and holding a resize handle will activate the event handler that tracks how much the mouse moves onscreen while the handle is held (FIG. 12). The difference in position is simply added to the primary dimension and subtracted from the secondary dimension relative to the orientation of the primary and secondary nodes. This addition and subtraction occurs first in the data structure of the layout and then applied to the style property of the DIV node to reflect the size change onscreen. For example, movement of a resize handle of a secondary vertical subdivision tracks a horizontal (x-coordinate) component of the movement in order to horizontally reposition the handle-equipped vertical boundary between the subdivisions. On the other hand, movement of a resize handle of a secondary horizontal subdivision tracks a vertical (y-coordinate) component of the movement in order to vertically reposition the handle-equipped horizontal boundary between the subdivisions.

A special case exists when the initial area is selected as the primary node (FIG. 9). There is no secondary node when an initial area is selected. Insertion handles are placed as per selection of any subdivision however additional resize handles are placed. A resize handle is placed on the right side (FIG. 9, Item 5) and one is placed on the bottom side (FIG. 9, Item 6). A resize handle is placed in the corner of the initial area to indicate that both width and height can be resized concurrently (FIG. 9, Item 7). Resizing the initial area follows the same rules as resizing any subdivision.

There are two ways in which the difference is split: crisp logic and fuzzy logic. The edge case of a difference of one pixel being split between two subdivisions is taken care of first. A cumulative value is tracked against the larger subdivision. A one pixel change occurring via the resize handle between the two subdivisions in question increments or decrements the cumulative change by one. The ratio is calculated as the larger subdivision's dimension relative to the smaller subdivision's dimension, and it is updated as the dimension changes. Since a change of one pixel cannot be split between two subdivisions it is transferred to the subdivision that has the largest share of the bounding division's dimension, so long as the cumulative single-pixel change count is less than or equal to the ratio of the larger subdivision's dimension to the smaller subdivision's dimension. However, if after any given single-pixel change input from the resize handle the absolute value of the cumulative change is greater than the ratio, then the one pixel is added to the smaller subdivision's dimension instead and the cumulative change is reset to zero.

For example, consider two adjacent horizontal subdivisions with one height $Y_1$ and the other height $Y_2$. If $Y_1$ is greater than $Y_2$ then the ratio is $Y_1/Y_2$ otherwise it is $Y_2/Y_1$. When the ratio is exactly 1 (i.e. $Y_1=Y_2$) then the top subdivision (or left subdivision if the subdivisions are vertically divided) is represented by the fractional ratio, otherwise it is the division with greater dimension. A detected one-pixel increase in the bounding division size increments the initially zero cumulative change value up to one. If the cumulative change is less than the value of the ratio, the single-pixel increase is added to the subdivision represented by the antecedent (i.e. the larger subdivision). The ratio is recalculated with the new dimensions. Under further single-pixel increases of the bounding division, the cumulative change count is incremented by one. If at any time the cumulative change is greater than the ratio the one-pixel change is instead added to the smaller subdivision and the cumulative change value is reset to zero.

The second case is a fuzzy logic rule that applies when the difference is greater than 1 but less than some reasonable but adjustable limit. Fuzzy logic rules apply a set of rules to varying degrees to find a fuzzy weighted average that specifies how much difference should be propagated to the subdivisions' dimensions. The fuzzy weighted difference may end up less than the actual change in dimension, this difference being a subsequent difference. The subsequent difference is then propagated to the subdivisions as a change in dimension of one pixel as many times as necessary to make up any difference in the fuzzy weighted difference with the actual change in dimension.

The third case occurs when the difference is more than the reasonable limit set for the fuzzy logic rules. A formula splits the difference between two subdivisions based on each subdivision's share of the bounding division's dimension, determining the change for each subdivision as:

(1+difference/bounding division's dimension)×subdivision's dimension

The above formula behaves well when the difference is greater than the reasonable limit however when the difference is less than the reasonable limit and greater than one the difference is split with a large bias toward one subdivision therefore a fuzzy weighted difference is required to give a balanced split in difference.

A special case exists in that another distinct layout can be placed inside an initial area or a subdivision. When a bounding division is resized the difference is applied to the appropriate dimension of the initial area of the distinct layout. The difference is then propagated within the distinct layout according to the resize rules above.

The user continues to modify the layout by selecting any subdivision and the application creates the underlying data structure and updates the graphical layout. When the user is ready they can save the layout's dimensions. The algorithm determines the underlying layout by starting with the initial area and recursively determining the dimensions and orientation of each subdivision. The data structure is then submitted to the server-side application which serializes the data structure and performs error checking. If the serialization passes error checking then the serialized data is stored in the database or file system otherwise the user is notified of an error.

Figure 13:
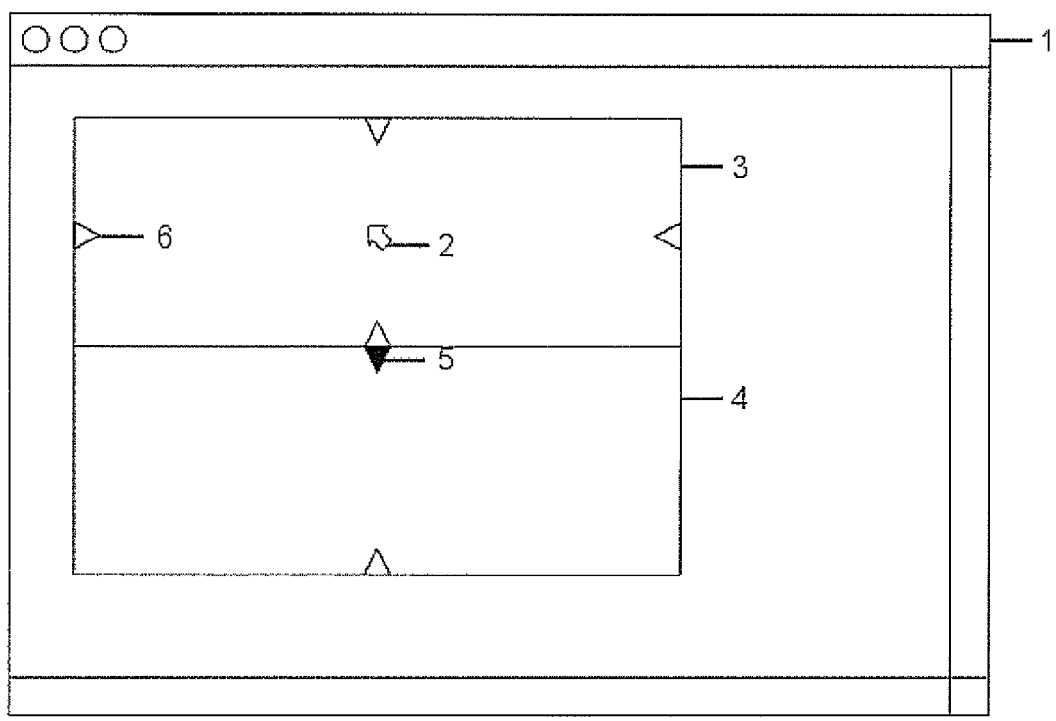
FIG. 13 is a schematic screenshot illustration showing the user interface displaying the layout of FIG. 3 with insertion handles on a top or primary one of two horizontal subdivisions and a resize handle and insertion handle of a bottom or secondary one of the two horizontal subdivisions thereof.

A layout can also be modified by inserting or deleting subdivisions. In order to insert a subdivision a user must select a candidate subdivision that represents the ideal placement beside the insertion (FIG. 13). Once the primary node is selected then the user needs to select a handle and adjust the position of the handle toward the opposite handle in the subdivision, thus defining a new subdivision at a location between the side of the existing subdivision from which the handle was dragged and the opposing side of that subdivision thereby splitting that subdivision into two further subdivisions.

A new subdivision can be inserted on any side of a primary subdivision by selecting a subdivision and then selecting any of the appropriate handles of it or selecting the insertion handle of the secondary subdivision. A user inserts a new subdivision to the left of a primary subdivision by selecting and holding the left insertion handle and then moving towards the right handle (FIG. 15). A user inserts a new subdivision on top of a primary subdivision by selecting and holding the top insertion handle and then moving down toward the bottom handle (FIG. 16). Inserting a new subdivision to the right or bottom of the primary subdivision is done in an analogous manner as to the left and top sides. In visual terms, the position to which the respective side or boundary was dragged by the insertion handle defines the position of the new dividing boundary created through this action to split the handle-dragged subdivision into two subdivisions.

By selecting a primary subdivision, the secondary subdivision is also displayed with its resize handle and its insertion handle. A new subdivision can also be inserted on the one side of secondary subdivision indicated by the insertion handle furthest away from primary subdivision (FIG. 17) by dragging the insert handle at this outer side of the secondary subdivision toward the primary subdivision.

Selecting a subdivision and inserting new subdivisions will actually modify the data structure, modify the DOM tree and the insertion functionality will revert to a resize functionality. Initially, a subdivision is selected as a primary subdivision, but once the action of inserting a new subdivision is committed via an insertion handle of that primary subdivision, then the newly inserted subdivision becomes the primary subdivision (FIGS. 13, 15, 16) and the remainder of the former primary subdivision not occupied by the new subdivision becomes the secondary subdivision. On the other hand, when the insertion is committed on the secondary subdivision the remaining portion of that secondary subdivision not occupied by the new subdivision remains as the secondary subdivision, and the newly inserted subdivision is the primary subdivision (FIGS. 13 and 17). The insertion handle that was just used to create the new subdivision is now associated with the newly created subdivision boundary, and changes immediately to a resize handle of the secondary subdivision for the remainder of the user action.

There are two special cases that are additionally handled and they are separate actions of deleting a subdivision and selecting a bounding division (i.e. how to select an area that contains subdivisions within in at, as merely clicking a point somewhere within the area will instead select the area's particular subdivision in which the point resides).

A layout will display only subdivisions and only terminal divisions (i.e. subdivisions with no further subdivisions within them) will respond to click or touch events. Therefore, in order to select a bounding division a primary subdivision needs to be selected. Selecting a primary subdivision, in addition to displaying the aforementioned resize and insertion handles, also displays a deletion icon (FIG. 18, Item 5) and a bounding division icon (FIG. 18, Item 6). By selecting a bounding division icon it triggers the bounding division containing the previously selected subdivision to be selected as the new primary subdivision, and accordingly causes the handles, deletion and bounding division icon to be displayed in association with this bounding division instead of the previously selected subdivision contained therein (FIG. 19).

Deleting a subdivision is done by clicking or touching the deletion icon in the primary subdivision, and preferably confirming the deletion (FIG. 20) through some further action, for example through a dialog box. By deleting a primary subdivision any initial area and any and all subdivisions or content contained within it will also be deleted. The secondary subdivision will also be deleted but then any initial area and any or all subdivisions and content contained within it will become the initial area or subdivisions and content of the bounding division and will expand to the dimensions of the bounding division using the resize algorithm.

Although the preferred embodiment is described in terms of webpage layouts, it will be appreciated that similar division of an onscreen page or layout may be useful in other areas. Also, while the described embodiment uses employs a webserver to interact with users over the Internet via a web browser-displayed user interface, it will be appreciated that other embodiments may operate in other networked environments or operate as a locally installed software application on a workstation, desktop computer, laptop, tablet, PDA, mobile/cellular smartphone, etc. to generate customized layouts.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A computer-implemented method of displaying and editing a layout of areas, the method comprising:
   (a) from a computer readable medium, retrieving serialized data representative of the page layout, the serialized data comprising a string of characters in which respective pairs of adjacent subdivisions of the layout are denoted by respective three-position representations in the string of characters, with a first position of each representation containing a single-character orientation indicator that denotes an orientation of the respective pair of adjacent subdivisions by adopting one of only two possible values that respectively denote horizontal and vertical orientations, and second and third positions of each representation containing content indicators that respectively denote contents of said respective pair of adjacent subdivisions, wherein each of the second and third positions of at least one respective pair of adjacent subdivisions is either occupied by a single-character empty-status indicator indicating that a respective one of said one respective pair of adjacent subdivisions is an empty subdivision that is empty of any further subdivisions therein, or occupied by a respective three-position representation of another pair of adjacent subdivisions to reflect that said other pair of adjacent subdivisions is contained within said respective one of said one respective pair of adjacent subdivisions, and wherein the serialized data lacks unique identifiers for the subdivisions, and the single-character empty-status indicator has only one possible value that is the same for each one of a plurality of empty subdivisions in the layout, whereby each and every character in the string of characters is has one of only three possible values;
   (b) parsing the serialized data to extrapolate data on the page layout and generate a binary tree data structure that is representative of the page layout and comprises at least one internal node representing a respective splitting of the layout or a subdivision of the layout into one of the pairs of adjacent subdivisions of the layout;
   (c) automatically generating a respective unique identifier for each empty subdivision by sequentially appending values read from a respective series of nodes located on a path between a root node of the binary tree and a respective leaf node of the binary tree into a respective string of digits, and assigning said respective string of digits to said empty subdivision as the respective unique identifier for said empty subdivision; and
   (d) using the automatically generated unique identifiers to present an on-screen display of the page layout together with on screen handles and/or icons operable via a user input device to manipulate user-variable attributes of the layout, including a number count of subdivisions in said layout and dimensions of said subdivisions in said layout;
   (e) based on user input through the user input device and the on screen handles and/or icons to perform a modification one or more of said user-variable attributes of the layout, creating a revised binary tree data structure that is representative of a revised layout including said modification;
   (f) performing a repetition of steps (c) and (d) using the revised binary tree data structure, thereby updating the on-screen display to show the revised layout; and
   (g) updating the serialized data to reflect the revised layout, and storing the updated serialized data on the computer readable medium without any subdivision unique identifiers for later retrieval of same for use in a subsequent layout display and/or editing session.

2. The method of claim 1 wherein the serialized data further comprises a string of separated dimensional values, of which a first two dimensional values represent an overall height and width of the layout, and additional dimensional values after the first two dimensional values each respectively correspond to a respective pair of the subdivisions within the layout and are sequenced in matching order with the single-character orientation indicators of said subdivisions in the string of characters.

3. The method of claim 2 wherein the layout includes both horizontally divided adjacent subdivisions and vertically divided adjacent subdivisions and, wherein the additional dimensional values consist of only a single dimensional value for each pair of adjacent subdivisions that is shared by the adjacent subdivisions of said pair, the method including using said single dimensional value as an offset relative to one dimension of a bounding area containing said pair of adjacent subdivisions to determine a first dimension of each of said adjacent subdivisions and inheriting the other dimension of the bounding area as a second dimension of each of said adjacent subdivisions.

4. The method of claim 1 wherein each of the values read from the series of nodes is a single digit binary value.

5. A computer implemented method of editing a visually-borderless layout of areas on a using on-screen control elements that comprise a set of primary handles and a set of secondary handles and are operable via a user input device to manipulate user-variable attributes of the layout including a number count of subdivisions in said layout and dimensions of said subdivisions in said layout, the method comprising:
(a) in a user interface, displaying the layout along with the set of primary handles, which are automatically displayed at all four zero-border boundaries of an initially selected primary subdivision of the layout;
(b) receiving input via the user input device reflective of a selection of a different subdivision of the layout than the initially selected subdivision of step (a), and in response to said input, setting the different subdivision as a currently selected primary subdivision and changing a location in the user interface at which the control elements are displayed by automatically displaying the set of primary handles at all four zero-border boundaries of the currently selected primary subdivision instead of at the four zero-border boundaries of the initially selected subdivision of step (a), and automatically displaying the set of secondary handles at an adjacent secondary subdivision that is adjacent to said currently selected primary subdivision;
(c) receiving further input via the user input device and the control elements to modify one or more of said user-variable attributes;
(d) updating data representing the layout based on said further input; and
(e) updating the display of the layout in the user interface based on the updated data to present a revised layout based on new values of said one or more user-variable attributes;
wherein the primary and secondary handles include insertion and resizing handles, and, during step (b), no handles are displayed at any subdivisions other than the currently selected primary subdivision and adjacent secondary subdivision, the set of secondary handles includes a secondary handle displayed at a zero-border outer side of the adjacent secondary subdivision that lies opposite to the primary subdivision, the set of secondary handles are visually distinct from the set of primary handles, and the primary and secondary handles serve as a sole visual indication of which subdivision has been selected and a sole visual indicator of where the zero-border boundaries of the currently selected subdivision and the zero-border outer side of the adjacent secondary subdivision reside.

6. The method of claim 5 wherein the primary handles consist of four insertion handles respectively displayed at four sides of the currently selected primary subdivision and each operable to insert a new subdivision into the layout at a respective one of said four sides of the currently selected primary subdivision, and no resize handles are displayed at the primary subdivision.

7. The method of claim 6 wherein the secondary handle at the zero-border outer side of the adjacent secondary subdivision is an insertion handle that is operable to insert a new subdivision at the zero-border outer side of the adjacent secondary subdivision, and the secondary handles consist only of said insertion handle and a resize handle that is operable to resize the currently selected primary subdivision and the adjacent secondary subdivision and is displayed at a zero-border inner side of the adjacent secondary subdivision that borders the currently selected primary subdivision.

8. The method of claim 5 wherein step (b) comprises automatically displaying a bounding area icon, and wherein the method further comprises a step of receiving additional input reflective of selection of the bounding area icon, in response to which a bounding subdivision that contains the different subdivision and adjacent secondary subdivision of step (b) automatically becomes the currently selected subdivision at which the primary handles are accordingly displayed automatically, and a neighbouring subdivision adjacent to the bounding subdivision automatically becomes the adjacent secondary subdivision at which the set of secondary handles are displayed.

9. The method of claim 8 further comprising receiving further input via the user input device and the control elements to perform a resizing of the bounding subdivision, and automatically resizing the subdivisions contained within the bounding subdivision based on the resizing of the bounding subdivision.

10. The method of claim 5 wherein the layout includes both horizontally divided adjacent subdivisions and vertically divided adjacent subdivisions and wherein the data representing the layout includes height and width data for the layout and, for each pair of adjacent subdivisions, orientation data representing an orientation of said subdivisions and size data for said subdivisions, the size data for each pair of adjacent subdivisions consisting solely of a single offset value that is shared between said pair and used to determine either heights or widths of said subdivisions relative to a respective height or width of a bounding area containing said subdivisions, and the other of said heights or widths of said subdivisions being inherited from said bounding area.

11. The method of claim 5 wherein the set of secondary handles comprises a resize handle that is displayed at a zero-border inner side of the adjacent secondary subdivision bordering the currently selected primary subdivision, and that is an only one of the control elements operable to resize the currently selected primary subdivision and the adjacent secondary subdivision.

12. The method of claim 11 wherein the primary consist only of four insertion handles respectively displayed at the four zero-border boundaries of the currently selected primary subdivision and each operable to insert a new subdivision into the layout at a respective one of said four sides of the currently selected primary subdivision.

13. The method of claim 5 wherein the secondary handle displayed at the zero-border outer side of the adjacent secondary subdivision is an insertion handle, and the secondary handles consist only of said insertion handle and a resize handle that is operable to resize the currently selected primary subdivision and the adjacent secondary subdivision and is displayed at a zero-border inner side of the adjacent secondary subdivision that borders the currently selected primary subdivision.

14. The method of claim 5 wherein only one primary handle is displayed at each zero-border boundary of the currently selected primary subdivision, and no more than one secondary handle is displayed at any non-zero border boundary of the second subdivision.

15. The method of claim 5 wherein the control elements comprise at least one insertion handle displayed a respective zero-border boundary of the layout that is operable to insert a new subdivision at said respective zero-border boundary, and wherein step (c) comprises inserting the new subdivision at the respective zero-border side boundary via manipulation of the insertion handle via the user input device, and step (e) comprises automatically setting the new subdivision as the currently selected subdivision and automatically displaying the first set of handles at said new subdivision instead of at the selected subdivision from step (b).

16. The method of claim 5 wherein the currently selected primary subdivision, or the secondary subdivision, in step (b) has an adjacent pair of subdivisions contained therein, the further input in step (c) comprises detection of a single-pixel resize event from the user input device and the control elements, and step (d) comprises, prior to updating the data representing the layout, selecting which of the adjacent pair of subdivisions to apply the single-pixel resize to by: (i) incrementing or decrementing a cumulative single-pixel resize count based on whether the detected single-pixel resize is a size increase or size decrease of the currently selected primary subdivision or the secondary subdivision; (ii) comparing the cumulative single-pixel resize count against a ratio of a size of a larger one of the adjacent pair of subdivisions to a size of a smaller one of the adjacent pair of subdivisions; (iii) assigning the single-pixel size resize to one of the pair of adjacent subdivisions based on a rule dictating that that any single-pixel resize is to be assigned to the larger one of the pair of adjacent subdivisions if the cumulative single-pixel resize count is not greater than the ratio, or assigned to the smaller one of the pair of adjacent subdivisions if the cumulative single-pixel resize count is greater than the ratio, and (iv) resetting the cumulative single-pixel resize count.

17. The method of claim 5 wherein the currently selected primary subdivision, or the secondary subdivision, in step (b) has an adjacent pair of subdivisions contained therein, the further input in step (c) comprises detection of a resize event from the user input device and the control elements, and step (d) comprises, prior to updating the data representing the layout, (i) checking whether a pixel value of the detected resize event is greater than one but less than a predetermined threshold; (ii) on the basis of a determination that the pixel value of the detected resize event is greater than one but less than the predetermined threshold, applying fuzzy logic rules to the detected resize event, and applying changes in size to the pair of adjacent subdivisions based on output from said fuzzy logic rules.

18. The method of claim 17 wherein step (d)(ii) comprises determining a fuzzy weighted size change to be applied to the pair of subdivisions calculating a difference between the fuzzy weighted size change and the pixel value of the resize event, applying said fuzzy weighted size change, and applying individual single pixel size changes to one of the pair of adjacent subdivisions as needed until a number of said single pixel size changes performed equals the calculated difference between the fuzzy weighted size change and the pixel value of the resize event.

19. The method of claim 5 wherein the currently selected primary subdivision, or the secondary subdivision, in step (b) has an adjacent pair of subdivisions contained therein, the further input in step (c) comprises detection of a resize event from the user input device and the control elements, and step (d) comprises, prior to updating the data representing the layout, selecting which of the adjacent pair of subdivisions to apply the size change to by: (i) checking whether a pixel measurement of the size change is greater than a predetermined threshold; (ii) on the basis of a determination that the pixel measurement of the size change is greater than the predetermined threshold, splitting the size change between the pair of subdivisions based on a share of area of the currently selected primary subdivision or secondary subdivision occupied by each of the pair of adjacent subdivisions therein.

20. The method of claim 19 wherein splitting the size change in step (d) is performed subject to a prior confirmation in step (d) that a pixel measurement of the size change is greater than one, and also greater than a predetermined threshold having a value in excess of one.

* * * * *